United States Patent [19]
Tricoles et al.

[11] Patent Number: 4,626,860
[45] Date of Patent: * Dec. 2, 1986

[54] PASSIVE SYNTHETIC APERTURE SYSTEM FOR IMAGING A SOURCE OF ELECTROMAGNETIC RADIATION

[75] Inventors: Gus P. Tricoles, San Diego; Eugene L. Rope, El Cajon, both of Calif.

[73] Assignee: General Dynamics Corporation, Electronics Division, San Diego, Calif.

[*] Notice: The portion of the term of this patent subsequent to Dec. 20, 2000 has been disclaimed.

[21] Appl. No.: 503,175

[22] Filed: Jun. 10, 1983

Related U.S. Application Data

[63] Continuation-in-part of Ser. No. 171,979, Jul. 24, 1980, Pat. No. 4,422,076.

[51] Int. Cl.$^4$ ............ G01S 3/48; G01S 13/90
[52] U.S. Cl. ................. 342/442; 342/25; 342/394; 342/358
[58] Field of Search ........... 343/5 CM, 17, 5 EM, 343/394, 442, 451

[56] References Cited

U.S. PATENT DOCUMENTS

| | | | |
|---|---|---|---|
| 2,921,306 | 1/1960 | Jaffe | 343/451 |
| 3,378,842 | 4/1968 | Phillips | 343/458 |
| 3,789,410 | 1/1974 | Smith et al. | 343/458 |
| 3,887,923 | 6/1975 | Hendrix | 343/17 X |
| 3,909,827 | 9/1975 | Tricoles et al. | 343/17 |
| 3,935,574 | 1/1976 | Pentheroudakis | 343/424 |
| 3,971,027 | 7/1976 | Alcock et al. | 343/424 |
| 3,975,734 | 8/1976 | Payne | 343/5 CM |
| 4,179,697 | 12/1979 | Golinsky | 343/458 |
| 4,244,036 | 1/1981 | Raven | 367/12 |
| 4,385,301 | 5/1983 | Tricoles et al. | 343/17 X |
| 4,422,076 | 12/1983 | Tricoles et al. | 343/458 |

FOREIGN PATENT DOCUMENTS 1454368 1/1974 United Kingdom ............ 343/5 CM

Primary Examiner—Theodore M. Blum
Assistant Examiner—Gilberto Barrón, Jr.
Attorney, Agent, or Firm—Brown, Martin, Haller & Meador

[57] ABSTRACT

A vehicle-mounted passive synthetic aperture system for locating sources of electromagnetic radiation having a given wavelength $\lambda$. The system includes first and second receiving antennas, a phase sensitive receiver and a signal processor. The first and second antennas are mounted to a vehicle and spaced apart from each other in the principle direction of motion associated with the vehicle. The first and second antennas respectively provide first and second received signals in response to a wavefront of electromagnetic radiation having the given wavelength $\lambda$. The phase sensitive receiver is coupled to the first and second antennas and responds to the first and second received signals by providing a phase difference signal that indicates a phase difference $\phi$ between the wavefronts of the radiation of the given wavelength received by the respective first and second antennas when the received radiation is radiated spherically from its source. The speed of the vehicle also is measured. The signal processor processes the phase difference signal in combination with the measured vehicle speed to provide imaging signals for an object-space display of an image of the source of the electromagnetic radiation in relation to the location of the vehicle. The image is displayed. The system of the present invention effectively uses the motion of the vehicle to synthesize an aperture. The synthesized aperture is long relative to the spacing between the receiving antennas (which spacing is limited by vehicle size) so that angular resolution is greater than that of a fixed antenna system with a baseline length equal to the spacing between the receiving antennas of the present system.

10 Claims, 6 Drawing Figures

PASSIVE SYNTHETIC APERTURE SYSTEM FOR IMAGING A SOURCE OF ELECTROMAGNETIC RADIATION

CROSS REFERENCE TO RELATED APPLICATION

This application is a continuation-in-part of application Ser. No. 171,979 filed July 24, 1980, U.S. Pat. No. 4,422,076 entitled "PASSIVE SYNTHETIC APERTURE SYSTEM FOR LOCATING A SOURCE OF ELECTROMAGNETIC RADIATION".

BACKGROUND OF THE INVENTION

The present invention generally pertains to electromagnetic communications and is particularly directed to an improved system mounted on a vehicle for imaging sources of electromagnetic radiation.

Prior art systems mounted on a vehicle for locating sources of electromagnetic radiation include a system having a directional receiving antenna, a vehicle speed measurement device and a computer for determining the range from the vehicle to a remote source of radiation as the vehicle moves past the source. Images can be provided from the determinations of range and direction. Such system is described in U.S. Pat. No. 2,921,306 to Jaffe. Other prior art vehicle mounted systems include an array of antennas and receivers forming an interferometer, wherein the baseline length for use in resolving the location of the radiation source is limited to the physical dimensions of the vehicle.

SUMMARY OF THE INVENTION

The present invention provides a passive synthetic aperture system for locating a source of electromagnetic radiation having a given wavelength $\lambda$. The system basically includes first and second receiving antennas, a phase sensitive receiver and a signal processor. The receiver can be tuned to receive multi-frequency radiation.

The first and second antennas are mounted to a vehicle and spaced apart from each other by a predetermined distance in the principle direction of motion associated with the vehicle. The first and second antennas respectively provide first and second received signals in response to a wavefront of electromagnetic radiation having the given wavelength $\lambda$.

The phase sensitive receiver is coupled to the first and second antennas and responds to the first and second signals by providing a phase difference signal that indicates a phase difference $\phi_{21}$ between the wavefronts of the radiation of the given wavelength received by the respective first and second antennas when the received radiation is radiated spherically from its source.

The speed of the vehicle is measured.

The signal processor processes the phase difference signal past its point of closest approach to the radiation source in combination with the measurement of vehicle speed to provide imaging signals for an object-space display of an image of the source of the electromagnetic radiation in relation to the location of the vehicle.

The system of the present invention effectively uses the motion of the vehicle to synthesize an aperture. The synthesized aperture is long relative to the spacing between the receiving antennas (which spacing is limited by vehicle size) so that angular resolution is greater than that of a fixed antenna system with a baseline length equal to the spacing between the receiving antennas of the present system.

The theory and operation of the invention and various additional features thereof are discussed in relation to the description of the preferred embodiment.

DESCRIPTION OF THE PREFERRED EMBODIMENT

Figure 1:
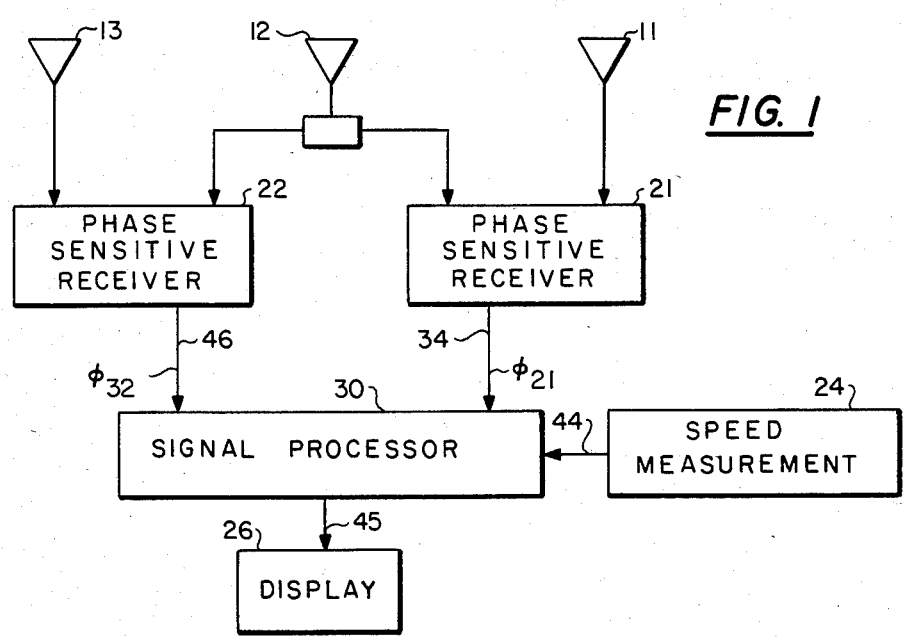
FIG. 1 is a schematic block diagram of the system of the present invention.
Figure 2:
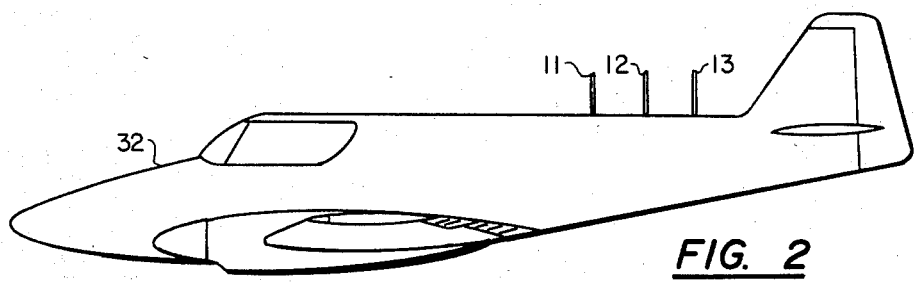
FIG. 2 schematically illustrates the receiving antennas of the system of FIG. 1 mounted on an airplane.

Referring to FIG. 1, the preferred embodiment of the system of the present invention includes a first receiving antenna 11, a second receiving antenna 12, a third receiving antenna 13, a first phase sensitive receiver 21, a second phase sensitive receiver 22, a speed measurement device 24, a video display device 26, and a signal processor 30. The system is carried by a vehicle such as an airplane 32 (shown in FIG. 2), helicopter, missile, ship, train, truck, automobile or van.

The first, second and third receiving antennas 11, 12, 13 are mounted on the top of the fuselage of the airplane 32 and are spaced apart from each other by a distance "$2d$" along a center line running in the principle direction of motion associated with the airplane 32. The antennas 11, 12, 13 are monopole antennas. Alternatively, the antennas 11, 12, 13 may be dipole antennas having their receiving elements aligned with the principle direction of motion of the airplane.

The first, second and third receiving antennas 11, 12, 13 respectively provide received signals in response to wavefronts of electromagnetic radiation having the given wavelength $\lambda$ received by the first, second and third antennas.

The first phase sensitive receiver 21 is coupled to the first receiving antenna 11 and the second receiving antenna 12, and provides a first phase difference signal on a line 34 to the signal processor 30 in response to the first and second received signals provided by the first and second antennas 11, 12. The first phase difference signal on the line 34 (as shown in FIG. 3) indicates the phase difference $\phi_{21}$ between the wavefronts of the radiation of the given wavelength $\lambda$ received by the first and second antennas 11, 12.

Figure 3:
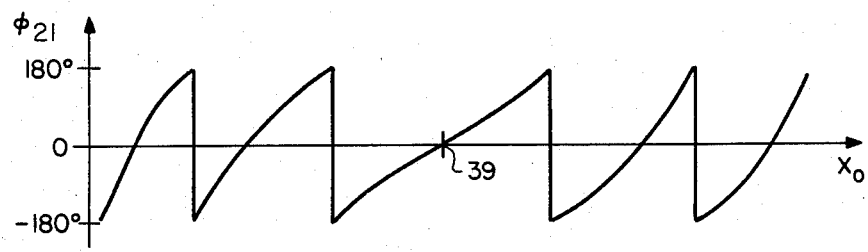
FIG. 3 illustrates the phase difference signal provided from a phase sensitive receiver in the system of FIG. 1 in relation to the displacement of the system when moving past a source of electromagnetic radiation.

Referring to FIG. 3, it is seen that the phase difference $\phi_{21}$ diminishes to zero as the midpoint $X_o$ approaches the tangential point 39 and then increases as the midpoint $X_o$ moves away from the point 39 along the flight path 37. In the waveform of FIG. 3, as displacement from the tangential point 39 increases, the phase difference $\phi_{21}$ indicated in each successive cycle is 360 degrees greater than in the preceding cycle.

The rate of change of phase difference $\phi_{21}$ with respect to displacement $X_o$ is greatly exaggerated in FIG. 3.

Figure 5:
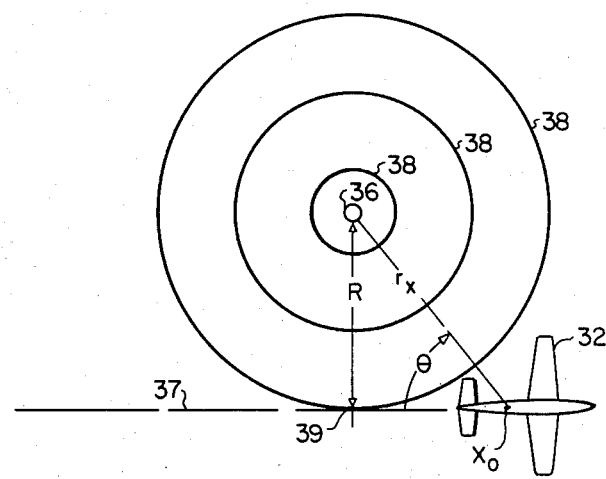
FIG. 5 illustrates the relationship of the flight path of the airplane to the wavefronts of the electromagnetic radiation emitted from the source.

Referring to FIG. 5, it is seen that when the airplane 32 flies in a straight path past a spherically radiation source 36, the flight path 37 of the plane 32 is tangential to one of the wavefronts 38 at a tangential point 39 that is a distance R from the source 36 when the airplane 32 is closest to the source 36. As the airplane 32 moves along the path 37, it is displaced by a distance $X_o$ from the tangential point 39.

Figure 4:
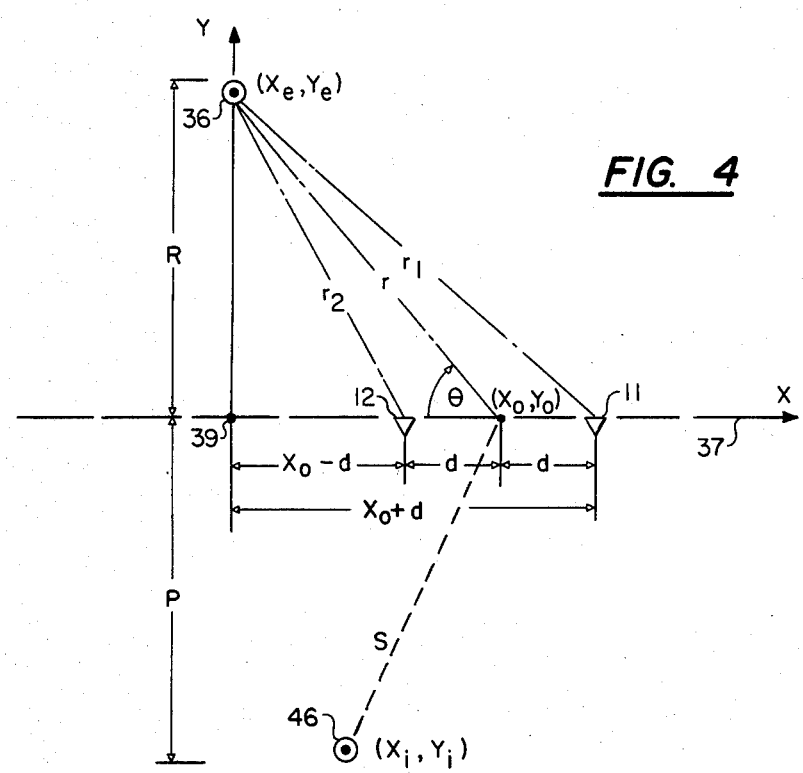
FIG. 4 is a diagram showing the spatial relationship of the receiving antennas of the system of FIG. 1 to the electromagnetic radiation source and the flight path.

Referring now to FIG. 4, the first and second receiving antennas 11, 12 are shown as they move along the flight path 37. A point $X_o$ midway between the antennas 11 and 12 represents the displacement of the airplane 32 from the tangential point 39. It is seen that the range from the first antenna 11 to the source 36 is $r_1$, and the range from the second antenna 12 to the source 36 is $r_2$.

Figure 6:
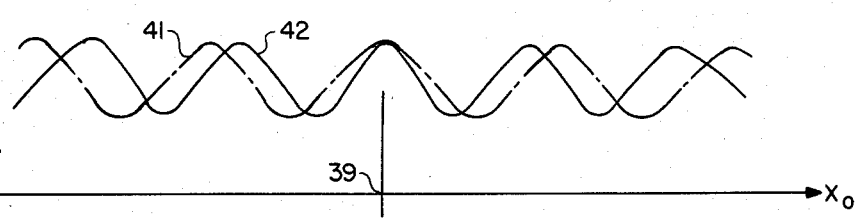
FIG. 6 illustrates the instantaneous relative intensity waveforms of the electromagnetic radiation received by adjacent receiving antennas of the system of FIG. 1 in relation to the displacement of the system when moving past the source of electromagnetic radiation.

FIG. 6 illustrates the instantaneous relative intensity waveforms 41 and 42 of the radiation of the wavelength $\lambda$ respectively received by the first and second antennas 11, 12 as their midpoint $X_o$ moves along the flight path 37 past the source 36. The changes during consecutive cycles is greatly exaggerated in FIG. 6. The scale for displacement $X_o$ in FIG. 6 is not the same as the scale for displacement $X_o$ in FIG. 3. It is seen that as the midpoint $X_o$ approaches the tangential point 39, the waveform 41 received by the first antenna 11 lags the waveform 42 received by the second antenna 12, and that as the midpoint $X_o$ moves away from the tangential point 39, the waveform 41 of the wavefront received by the first antenna 11 leads the waveform 42 of the wavefront received by the second antenna 12. At the tangential point 39, the waveforms 41 and 42 are in phase with each other. The phase difference between the waveforms 41 and 42 corresponds to the phase difference $\phi_{21}$ indicated by the first phase difference signal on line 34 illustrated in FIG. 4.

The speed measurement device 24 provides a signal on line 44 to the signal processor 30 to indicate the measured speed of the airplane 32.

The signal processor 30 provides imaging signals on lines 45 to the video display device 26 for display of an image of the radiation source 36 in relation to the location $X_o$ of the airplane 32.

First the signal processor 30 integrates the first phase difference signal $\phi_{21}$ to obtain the phase of the wavefront received from the radiation source 36 by the first and second antennas 11, 12 over a distance along the flight path 37.

The phase difference is $$\phi_{21} = \Delta\phi/\Delta X_o, \quad \text{(Eq. 1)}$$

where $\phi$ is the phase of the wavefront and $\Delta$ indicates a finite increment. For small increments, the differential form of Equation 1 is $$\phi_{21} = d\phi/dX_o, \quad \text{(Eq. 2)}$$

so that $$d\phi = \phi_{21} dX_o. \quad \text{(Eq. 3)}$$

In general, the phase $\phi$ of the wavefront is the integral of measured data $$\phi = \int \phi_{21} dX_o. \quad \text{(Eq. 4)}$$

The signal processor 30 thereby computes the value of the phase $\phi$ of the wavefront by integrating the phase difference signal $\phi_{21}$ on line 34 from the phase sensitive receiver 21 over a given distance along the path of motion 37 of the airplane as determined in response to the airplane-speed-measurement-indication signal on line 44. A given distance $\Delta X_o$ is determined in accordance with $$\Delta X_o = v\Delta t. \quad \text{(Eq. 5)}$$

where v is the speed of the airplane as indicated by the signal on line 44 and $\Delta t$ is an interval measured by an internal clock in the signal processor 30.

The signal processor 30 further computes image intensity for an image-space X-Y coordinate matrix in accordance with the computed phase-of-the-wavefront value $\phi$ and the measured speed of the airplane. The signal processor 30 computes image intensity in accordance with Huygens' principle as expressed by $$U = \int_{-L}^{L} \exp(i\phi)\exp(-i\pi X_o^2/\lambda f)\exp(i2\pi S/\lambda)S^{-1}dX_o \quad \text{(Eq. 6)}$$

"f" is the focal length of a simulated lens. "S" is the distance between the integration point $X_o$ and a general point 46 in image space and as shown in FIG. 4.

$$S = \sqrt{P^2 + (X_o - X_i)^2} \quad \text{(Eq. 7)}$$

$$P = Y_i - Y_o \quad \text{(Eq. 8)}$$

Image intensity $|U|^2$ is computed in accordance with Equation 6 for variable values of $X_i$ and $Y_i$ for an X-Y image-space matrix. The value of $\phi$, the phase of the wavefront, is derived from the aforementioned computation of $\phi$ in accordance with Equation 4.

Y coordinate values are referenced to the flight path 37 (the X axis), whereby the value of $Y_o$ is zero.

The integration distance "2L" is selected arbitrarily in accordance with the resolution desired. Vehicle displacement $X_o$ is derived from the measured values of vehicle speed indicated by the signal on line 44 and phase difference $\phi_{21}$ as indicated by the first phase difference signal on line 34.

From successive received values of the phase difference signal $\phi_{21}$ on line 34 separated in time by an interval $\Delta t$, the signal processor 30 determines $\Delta\phi_{21}$. From the speed indication signal on line 44 having a value v, the signal processor determines the change in displacement $\Delta X_o = v\Delta t$ over the interval $\Delta t$. $\Delta t$ is measured by the internal clock of the signal processor 30. From these determinations, the signal processor 30 further determines a factor "A" defining the relationship between $\Delta\phi_{21}$ and $x_o$ to wit:

$$A = \Delta X_o / \Delta\phi_{21}, \text{ or} \quad \text{(Eq. 9)}$$

$$A = v\Delta t / \Delta\phi_{21}. \quad \text{(Eq. 10)}$$

"A" is the reciprocal of the slope of the $\phi_{21}$ vs. $X_o$ curve (FIG. 3). By monitoring the value of "A", the signal processor 30 determines when the vehicle 32 has moved past the point of closest approach 39 and thereby determines when the $\phi_{21}$ vs $X_o$ curve is in the segment corresponding to the movement of the vehicle 32 through the point 39.

Since $$X_o = A\phi_{21}, \qquad \text{(Eq. 11)}$$

when the vehicle 32 is moving in a straight line at a constant speed past the point 39, substituting Equation 10 into Equation 11 yields:

$$X_o = v\Delta t \phi_{21}/\Delta\phi_{21} \qquad \text{(Eq. 12)}$$

Since v, $\Delta t$, $\phi_{21}$ and $\Delta\phi_{21}$ are all measured values, $X_o$ is computed continuously in accordance with the measured speed of the airplane 32.

From the computed values of image intensity $|U|^2$ over the X-Y coordinate image-space matrix, the signal processor provides imaging signals on line 45 to the video display device 26. The video display device 26 responds to the imaging signals on line 45 by providing an image-space display of computed image intensity $|U|^2$ over the X-Y coordinate matrix. The location of the source 36 is determined by examining the image-space display image to locate the point of greatest image intensity in relation to the location $X_o$ of the airplane 32. The location $X_o$ is also indicated by the imaging signals on line 45 and displayed by the video display 26 in response to such signals.

The signal processor 30 further computes the object-space coordinate R of the radiation source 36 in relation to the location $X_o$ of the airplane 32.

The coordinate R corresponding to the distance of the radiation source 36 from the flight path 37 is computed by the signal processor in accordance with the focusing condition equation.

$$1/f = 1/R + 1/P \qquad \text{(Eq. 13)}$$

or $$R = 1/(1/f - 1/P) \qquad \text{(Eq. 14)}$$

The distance P is determined from the image-space display by observing the location of greatest image intensity in the display; and the value of the distance P is input to the signal processor 30. The focal length f is predetermined in order to compute image intensity $|U|^2$ in accordance with Equation 6. Alternatively the signal processor profiles computed values of image intensity and their respective coordinates to determine the coordinates in image-space where image intensity $|U|^2$ is at a maximum and provides the value of P from such determination.

The X coordinate of the radiation source 36 $X_e$ is at the zero value reference point, as shown in FIG. 3.

The signal processor 30 further provides imaging signals on line 45 derived from the computation of the coordinates $X_e$ and R to the video display device to cause the video display device to alternatively display an object-space image of the radiation source 36 in relation to the location $X_o$ of the airplane 32, as computed in accordance with Equation 12.

The system of FIG. 1 utilizes the third receiving antenna 13 and the second phase sensitive receiver 22 to provide a check for any yaw of the airplane 32. Referring to FIG. 1, the second phase sensitive receiver 22 is coupled to the second receiving antenna 12 and the third receiving antenna 13, and provides a second phase difference signal on a line 46 to the signal processor 30 in response to the second and third receiver signals provided by the second and third antennas 12, 13. The second phase difference signal on the line 46 indicates the phase difference $\phi_{32}$ between the wavefronts of the radiation of the given wavelength received by the second and third antennas 12, 13. The phase difference $\phi_{32}$ indicated by the second phase difference signal on the line 46 is proportional to the difference between the respective ranges from the second and third antennas 12, 13 to the source of the received radiation when the radiation is radiated spherically from the source.

The signal processor 30 compares the phase difference $\phi_{21}$ indicated by the first phase difference signal on line 34 at a time $t_o$ when the first and second antennas 11, 12 occupy a given absolute position in space, to the phase difference $\phi_{32}$ indicated by the second phase difference signal on the line 45 at the time $t_o + \Delta t$ that the second and third antennas 12, 13 would occupy the same position in space if the motion of the airplane 32 were in a straight line. Thus, if the flight path 37 is a straight line and the radiation source 36 is stationary, $$\phi_{21}(t_o) = \phi_{32}(t_o + \Delta t). \qquad \text{(Eq. 15)}$$

Any deviation from equality of $\phi_{21}(t_o)$ and $\phi_{21}(t_o + \Delta t)$ is an indication that the airplane is turning, and a correction is made to the measured data by the signal processor 30 to compensate for the yaw of the airplane.

It is assumed that the interval $\Delta t$ between the measurements of $\phi_{21}$ and $\phi_{32}$ is sufficiently small that phase changes caused by translation toward the source are not significant. This assumption is reasonable because the incident wavefront arrives from directions that are approximately orthogonal to the flight path 37; provided that the angel $\phi$ is not less than approximately 45 degrees.

The system of the present invention is passive. It does not radiate.

The system of the present invention does not require a local oscillator to provide a reference signal. The system is self-referencing. The reference is derived from the source of the received radiation of the given wavelength $\lambda$. Therefore, any atmospheric and multipath effects on the received signals are present in the radiation fields received by all of the receiving antennas. Any reference signal provided by a local oscillator on board the vehicle would not contain any atmospheric effects.

The system of the present invention is coherent for each separate source of radiation of the given wavelength $\lambda$; but distinct non-coherent sources of such radiation can be non-coherently processed. Thus speckle noise or coherent breaking would be reduced.

We claim:

1. A vehicle-mounted system for locating a source of electromagnetic radiation having a given wavelength, comprising
   first and second receiving antennas mounted to a vehicle and spaced apart from each other by a predetermined distance in the principal direction of motion associated with said vehicle for respectively providing first and second received signals in response to a wavefront of electromagnetic radiation having said given wavelength received by the first and second antennas;
   a first phase sensitive receiver coupled to the first and second antennas for responding to the first and second received signals by providing a first phase difference signal that indicates a phase difference $\phi_{21}$ between the wavefronts of the radiation of the given wavelength received by the respective first and second antennas when said received radiation is radiated spherically from said source, whereby the value of the first phase difference signal varies as the vehicle moves in a straight line;

means operable when said vehicle is moving for measuring the speed of said vehicle; and a signal processor for processing the values of the first phase difference signal provided as the vehicle moves in a straight line past its point of closest approach to said radiation source in combination with said vehicle speed measurement to provide imaging signals for visible display of an image of said source in relation to the location of said vehicle.

2. The system according to claim 1, wherein the signal processor integrates said phase difference signal over a given distance along the path of motion of the vehicle as determined in response to said vehicle speed measurement to compute the value of the phase of said wavefront, computes image intensity in accordance with said computed phase of the wavefront value and said vehicle speed measurement for an image-space coordinate matrix, computes object-space coordinates of said source in response to said image intensity computations, and provides said imaging signals for displaying a visible object-space image of said source in accordance with said computed object-space coordinates.

3. A system according to claim 2, further comprising display means responsive to said imaging signals for providing said visible object-space display.

4. A system according to claim 1, further comprising display means responsive to said imaging signals for providing said visible display.

5. A system according to claim 1, further comprising a third receiving antenna mounted to said vehicle and spaced apart from the second antenna by the predetermined distance in the principal direction of motion associated with said vehicle for providing a third received signal in response to said wavefront of electromagnetic radiation having said given wavelength received by the third antenna;

a second phase sensitive receiver coupled to the second and third antennas for responding to the second and third received signals by providing a second phase difference signal that indicates a phase difference $\phi_{32}$ between the wavefronts of the radiation of the given wavelength received by the respective second and third antennas when said received radiation is radiated spherically from said source, whereby the value of the second phase difference signal varies as the vehicle moves in a straight line; and wherein the signal processor is coupled to the first and second phase sensitive receivers for comparing the phase difference $\phi_{21}$ at a time when the first and second antennas occupy a given absolute position in space, to the phase difference $\phi_{32}$ at the time that the second and third antennas would occupy the same position if the motion of said vehicle were in a straight line, to provide an indication of vehicle yaw.

6. In a vehicle-mounted system for locating a source of spherically-radiated electromagnetic radiation including a vehicle, a pair of receiving antenna means mounted to the vehicle in spaced relationship in the direction of principal motion of the vehicle for providing received signals in response to spherically-radiated electromagnetic radiation emanating from a radiation source, receiving means responsive to the received signals for providing a phase difference signal indicative of a phase difference proportional to the difference in ranges between the receiving antenna means and a wavefront of radiation emanating from said radiation source, and means for providing a measurement of the speed of said vehicle, wherein the improvement comprises:

signal means for providing imaging signals for display of an image of said radiation source in relation to a position of said vehicle based upon said phase difference signal and said measured speed.

7. The improvement of claim 6, wherein said signal means includes processing means for:

determining a phase of said wavefront based upon integration of said phase difference signal over a given distance travelled by said vehicle along a path of motion past said radiation source;

determining image intensity for a predetermined image-space coordinate matrix based upon said computed wavefront phase and said measurement of speed;

determining object-space coordinates of said radiation source based upon said image intensity determination; and providing said imaging signals in a format for displaying an object-space image of said radiation source in accordance with said computed object-space coordinates.

8. The improvement of claim 7, further comprising display means responsive to said imaging signals for displaying said object-space image.

9. The improvement of claim 6, wherein said signal means includes processing means for determining a phase of said wavefront based upon integration of said phase difference signal over a given distance travelled by said vehicle along a path of motion past said radiation source and determining image intensity for a predetermined image-space coordinate matrix based upon said computed wavefront phase and said measurement of speed; and said improvement further includes display means responsive to said image intensity determination for providing an image-space display of determined image intensity over said coordinate matrix.

10. The improvement of claim 6, further comprising: display means responsive to said imaging signals for providing said image display.

* * * * *